US008013247B2

(12) United States Patent
Werth et al.

(10) Patent No.: US 8,013,247 B2
(45) Date of Patent: Sep. 6, 2011

(54) CARBON NANOTUBE-BASED ELECTRONIC DEVICES

(75) Inventors: Janet Werth, Bedford, MA (US); Sarah O'Donnell, Reston, VA (US); David Lamensdorf, Concord, MA (US); Jim Marshall, Purcellville, VA (US); Lucien Teig, Sudbury, MA (US)

(73) Assignee: The MITRE Corporation, McLean, VA (US)

( * ) Notice: Subject to any disclaimer, the term of this patent is extended or adjusted under 35 U.S.C. 154(b) by 1100 days.

(21) Appl. No.: 11/790,488

(22) Filed: Apr. 25, 2007

(65) Prior Publication Data

US 2008/0283267 A1 Nov. 20, 2008

Related U.S. Application Data

(60) Provisional application No. 60/794,504, filed on Apr. 25, 2006.

(51) Int. Cl.

| | |
|---|---|
| ***H02G 3/04*** | (2006.01) |
| ***H01B 1/04*** | (2006.01) |
| ***D01F 9/12*** | (2006.01) |

(52) U.S. Cl. .................... 174/68.1; 252/502; 423/447.1; 977/762; 977/742; 977/932

(58) Field of Classification Search ................. 174/68.1, 174/68.3, 135; 252/502; 423/447.1; 977/762, 977/742, 932, 745, 746, 748
See application file for complete search history.

(56) References Cited

U.S. PATENT DOCUMENTS

| | | | | |
|---|---|---|---|---|
| 6,677,624 | B2 * | 1/2004 | Ihm | 977/742 |
| 6,878,444 | B2 * | 4/2005 | Suzuki et al. | 977/742 |
| 7,244,499 | B2 * | 7/2007 | Sugiyama et al. | 977/745 |
| 7,635,503 | B2 * | 12/2009 | Dominguez et al. | 977/742 |
| 7,718,995 | B2 * | 5/2010 | Kawashima et al. | 977/742 |
| 7,749,477 | B2 * | 7/2010 | Jiang et al. | 977/742 |
| 7,749,801 | B2 * | 7/2010 | Choi et al. | 977/742 |

* cited by examiner

*Primary Examiner* — Angel R Estrada
(74) *Attorney, Agent, or Firm* — Sterne, Kessler, Goldstein & Fox P.L.L.C.

(57) ABSTRACT

Carbon nanotube-based devices that can be used to meet the growing miniaturization and performance needs of electronic systems, are provided. In particular, a transmission line and inductor that include nanotube bundles is disclosed. In a further embodiment a method for isolating nanotubes with proteins is disclosed. In another embodiment a nanoswitch using nanotubes is disclosed. In a final embodiment a low loss, high permeability material is disclosed that includes a conductive coil and a set of nanotube toroids.

9 Claims, 9 Drawing Sheets

200

400

900

CARBON NANOTUBE-BASED ELECTRONIC DEVICES

CROSS REFERENCE TO RELATED APPLICATIONS

The present application claims priority to U.S. Provisional Patent Application Ser. No. 60/794,504, entitled Carbon Nanotube-Based Electronic Devices, filed on Apr. 25, 2006, which is incorporated herein in their entireties.

BACKGROUND OF THE INVENTION

1. Field of the Invention

The present invention relates to nanotubes, and more particularly, to carbon nanotube-based electronic devices.

2. Background of Invention

Single-walled carbon nanotubes (SWNTs) are nanometer-diameter cylinders consisting of a single graphene sheet wrapped up to form a tube. Nanotubes of varying lengths and diameter can be fabricated. However, a typical SWNT can have a diameter of 2 mm and a length of 100 μm. Depending on how the graphene sheets are rolled, nanotubes can have a number of different structures. FIGS. 1A-C illustrates an armchair structure, zigzag structure and a chiral structure for a nanotube, respectively. Multi-walled carbon nanotubes (MWNT) also exist. These are essentially SWNTs within SWNTs. A variety of methods exist to fabricate carbon nanotubes, including laser evaporation, carbon arc methods and chemical vapor deposition.

Both experiment and theory have shown that SWNTs can be either metals or semiconductors, and that their electrical properties can often exceed the properties of the best metals and semiconductors. The remarkable electrical properties of SWNTs stem from the unusual electronic structure of the two-dimensional (2D) material graphene. Specifically, a SWNT has a bandgap in most directions in k-space, but has a vanishing bandgap along specific directions and is called a zero-bandgap semiconductor. Paul L. McEuen et al., *Electron Transport in Single-Walled Carbon Nanotubes*, MRS Bulletin, April 2004 at 272.

SWNTs have extraordinary electrical and mechanical properties that can be leveraged to support a wide range of nanotube-based electronic devices. In particular, SWNTs have higher electrical current density and thermal conductivity that any metal. For example, a copper wire with a cross sectional area of $3\times10^{12}$ $nm^2$ has a current density of 2 million electrons per $nm^2$-sec, while a SWNT with a cross sectional area of 3 $nm^2$ has a current density of 200 billion electrons per $nm^2$-sec. Furthermore, SWNTs exhibit ballistic electron transport in which there is no backscattering of electrons, which is a source of electrical resistance in metals. In addition to these electrical properties, SWNTs are mechanically stronger than most, if not all other materials.

Numerous potential applications have emerged for nanotubes. Among some of the applications contemplated, nanotubes can be used for field emission and shielding, transistors, fuel cells, chemical sensors and catalytic agents for other chemical processes.

Nanotubes have emerged as a possible solution to the increasing demand for smaller, more capable and more reliable sensors for low cost and adaptable surveillance. In general, advances in electronics are shrinking the size of radios and sensors, such as military handheld radios, biologic and chemical sensors and micro power impulse radar systems, for example. Within these systems conventional sized antennas have the negative characteristic of dominating system volume. Replacing conventional system antennas, however, with small antennas often has an undesirable consequence because small antennas are inefficient. In other devices, smaller switches are needed, and improvements to low loss, high permeability materials are needed to continue to support the increasing demands of miniaturization and energy efficiency required by small electronic devices.

What are needed are small electronic devices made from materials that are efficient, and can meet the growing miniaturization needs of electronic systems.

SUMMARY OF THE INVENTION

The present invention provides carbon nanotube-based devices that can be used to meet the growing miniaturization and performance needs of electronic systems. In particular, a transmission line and inductor that include nanotube bundles is disclosed. In a further embodiment a method for isolating nanotubes with proteins is disclosed. In another embodiment a nanoswitch using nanotubes is disclosed. In a final embodiment a low loss, high permeability material is disclosed that includes a conductive coil and a set of nanotube toroids.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Small Antennas

In one aspect of the invention, the properties of nanotubes are leveraged to create a unique transmission line configuration that can be applied to radio frequency ("RF") circuitry used in matching electrically small antennas. Electrically small antenna matching networks are generally inefficient. Inefficiencies found in a small antenna matching networks or tuning can be overcome through low loss RF components and/or tuning devices. In an embodiment of the invention, a transmission line that includes a bundle of approximately 10,000 SWNTs supported in a plane above a conductive sheet capable of supporting sufficient current carrying capacity needed for a small antenna matching network can be used to address these inefficiencies. In addition to being used as a transmission line, the above configuration can be coiled to create a high Q, low loss inductor. In another aspect of the invention, SWNTs can be used as RF switches for tuning the antenna bandwidth as well.

Figure 6:
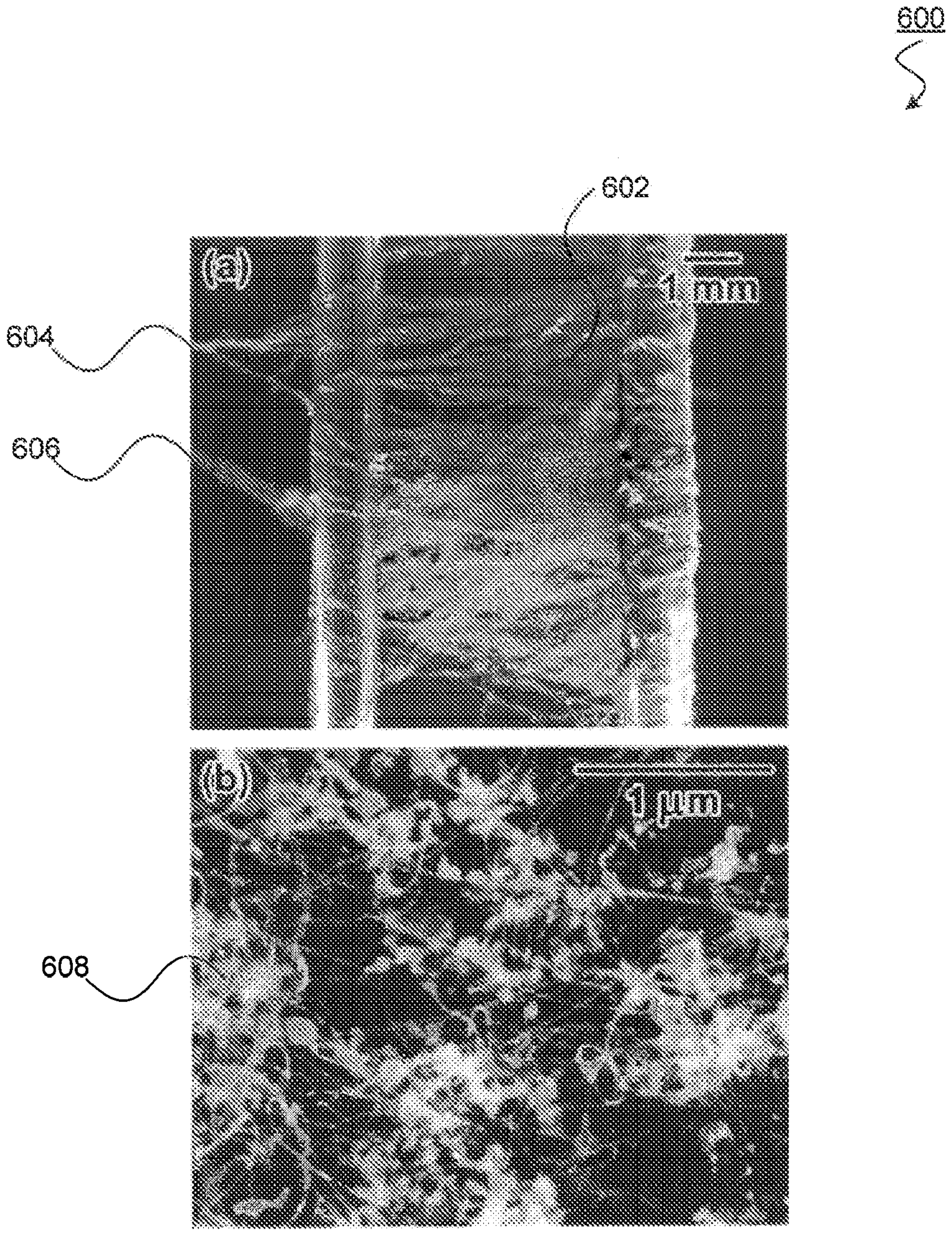
Prior Art FIG. 6
FIGS. 6*a* and 6*b* illustrate experimental examples of SWCNT bundles.
Figure 7:
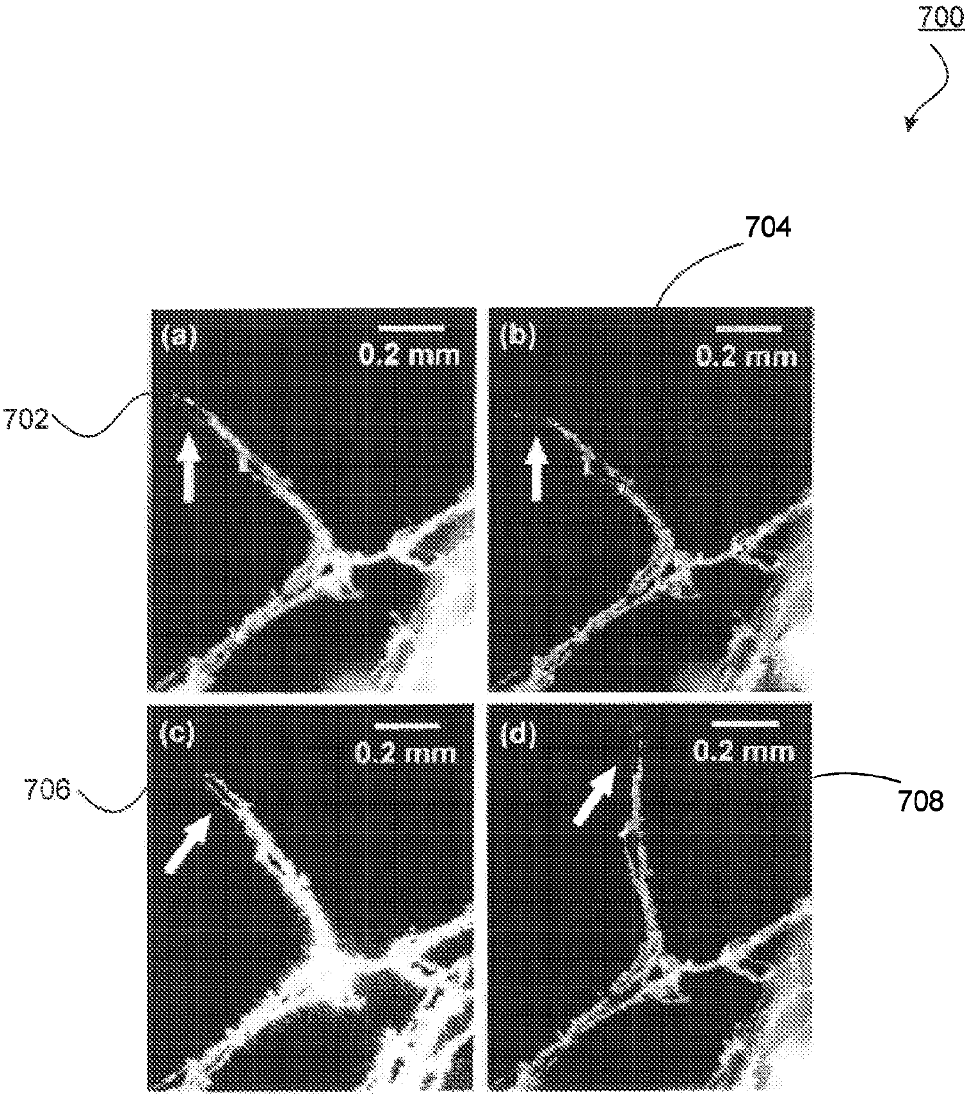
Prior Art FIG.7
FIG. 7 illustrates experimental examples of SWCNT bundles that have formed into filaments.

FIGS. 6*a* and 6*b* illustrate experimental realizations of bundles of SWNTs as discussed in Y. Zhang et al., *Elastic Response of Carbon nanotube Bundles to Visible Light*, Phys. Rev. Letters, V. 82, n.17, 26 Apr. 1999 (referenced below). FIG. 6*a* is an optical microscope photograph illustrating web-like filaments 602, 604, and 606 collected between two electrodes. The typical lateral size of an individual filament is of the order of 20-50 microns. FIG. 6*b* is a scanning electron microscope (SEM) photograph that shows the inner structure of a filament. Each filament contains many SWCNT bundles, some of which are aligned along the filament and some of which are tangled. FIGS. 7*a-d* show further examples of filaments (702, 704, 706, and 708) comprised of SWCNT bundles. It is this type of SWCNT bundles and filaments that are disclosed for use in novel devices in various embodiments.

Nanotubes used in the matching of electrically small antennas can significantly increase the antenna gain, depending on how small the antenna is and the instantaneous bandwidth desired. Antenna gain improvement, for applications such as mobile communications and remote unattended sensors where the unit is power limited, increases the life of the unit by conserving power as well as providing the ability to operate over longer ranges.

Limitations may exist on the conductance of nanotubes when bundled. Of critical concern is the dependence of the conductance of the nanotube on length and voltage for a configuration of interest, such as a high Q inductor for the ultra high frequency ("UHF") band. One approach to potentially address this concern is to align nanotubes to maximize conductivity properties within a manufacturable structure. Additionally, proteins can be used to isolate nanotubes to ensure that their RF transport properties are not degraded.

In an aspect of the invention, a selective DNA nanotube wrapping technique for separation, isolation and alignment of nanotubes is provided. The process involves wrapping of DNA-nanotubes or an oligomer-nanotube. Using this process non-covalent functionalization of the nanotubes may exist that leaves the electronic properties of bundled nanotubes intact.

Figure 1A:
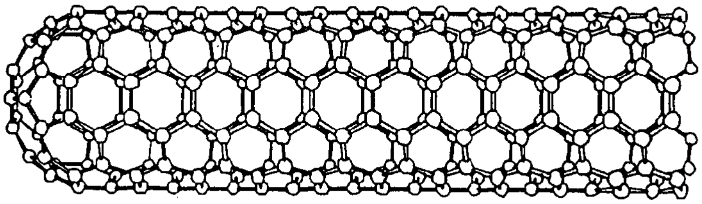
FIG. 1A is an illustration of a carbon nanotube having an armchair structure.
Figure 1B:
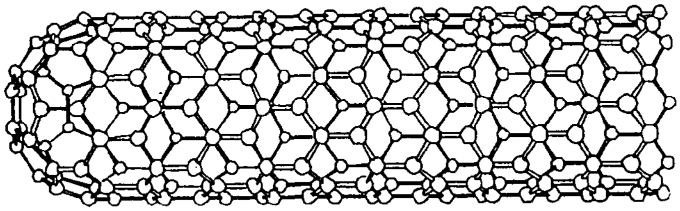
FIG. 1B is an illustration of a carbon nanotube having a zigzag structure.
Figure 1C:
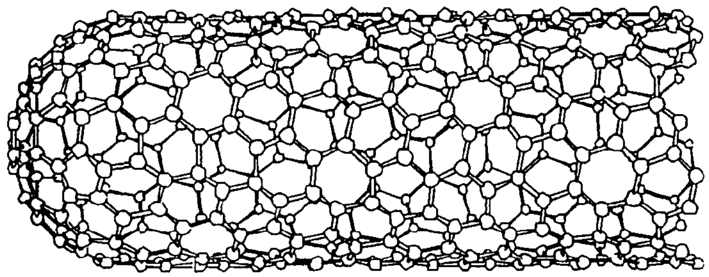
FIG. 1C is an illustration of a carbon nanotube having chiral structure.
Figure 2:
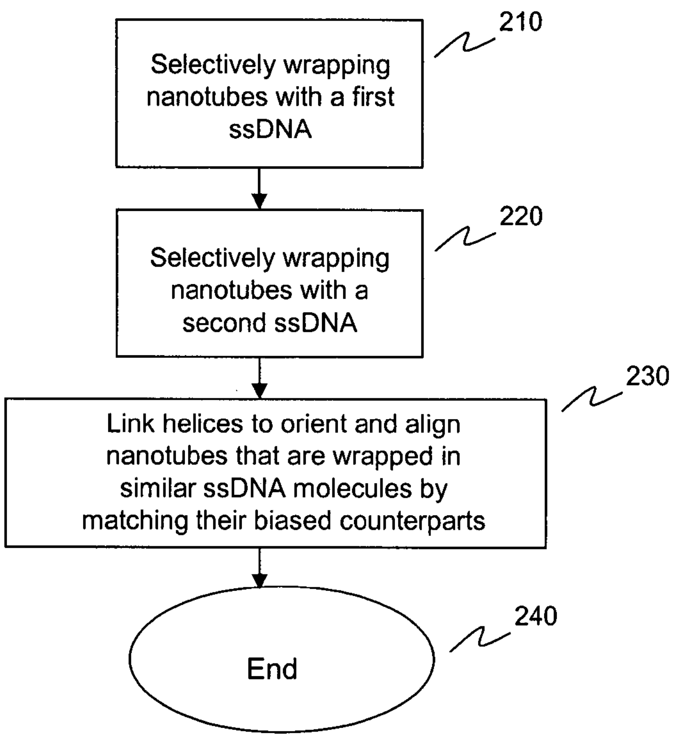
FIG. 2 is a flowchart of a method for synthetic biologic manipulation to wrap, isolate and combine nanotubes, according to an embodiment of the invention.

FIG. 2 provides a flowchart of a method 200 for synthetic biologic manipulation to wrap, isolate and combine nanotubes, according to an embodiment of the invention. Method 200 begins in step 210. In steps 210 and 220 a combination of single-stranded DNA helices are assembled using structure-based nanotubes sorted by sequence dependent DNA assembly. Specifically, in step 210 a first ssDNA (e.g., d(GT)n), selectively wraps around a nanotube of a specified diameter and symmetry. In step 220 a second ssDNA wraps around a nanotube at a helical pitch. In embodiments different modes of DNA-nanotube binding to produce varied helical pitches can be used. M. Zheng, et al., *Structure-based Carbon Nanotube Sorting by Sequence-Dependent DNA Assembly*, Science 302 (2003) 1545 and S. G. Chou et al., *Optical Characterization of DNA-wrapped Carbon Nanotube Hybrids*, Chem Phys Lett, 397 (2004) 296 describe various modeling of structure-based carbon nanotube sorting, which are incorporated herein by reference.

In step 230 biased helices are linked to orient and align nanotubes that are wrapped in similar ssDNA molecules by matching their biased counterparts. In alternative modes based on the use of different ssDNA, a pigtail or a larger pitch on a nanotube can be achieved. A double-helix of nanotubes forms between separate ssDNA modes to link nanotubes together in alignment. In step 240 method 200 ends.

Figure 3B:
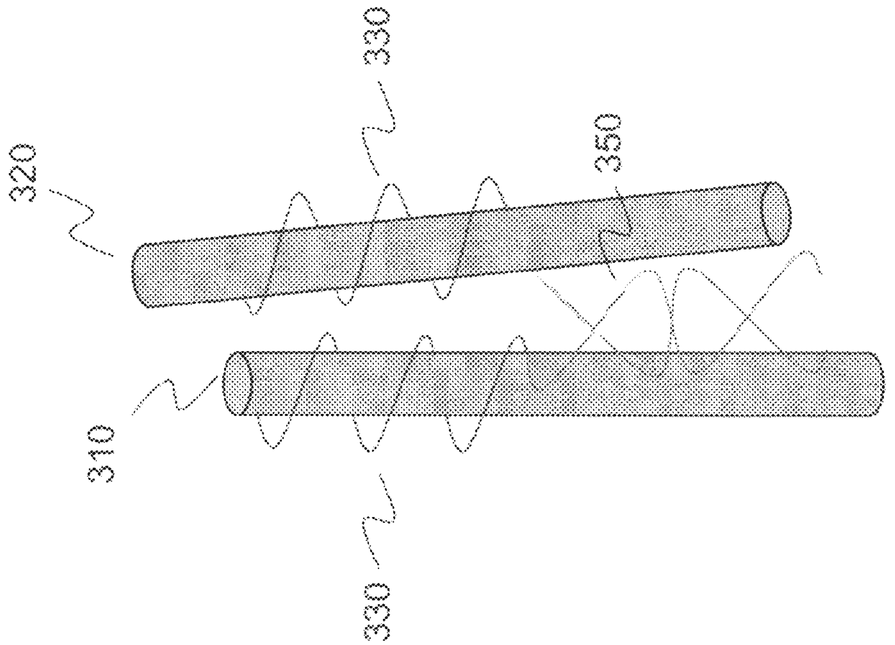
FIG. 3B provides a diagram of two nanotubes isolated with ssDNA in a pigtail arrangement, according to an embodiment of the invention.
Figure 3A:
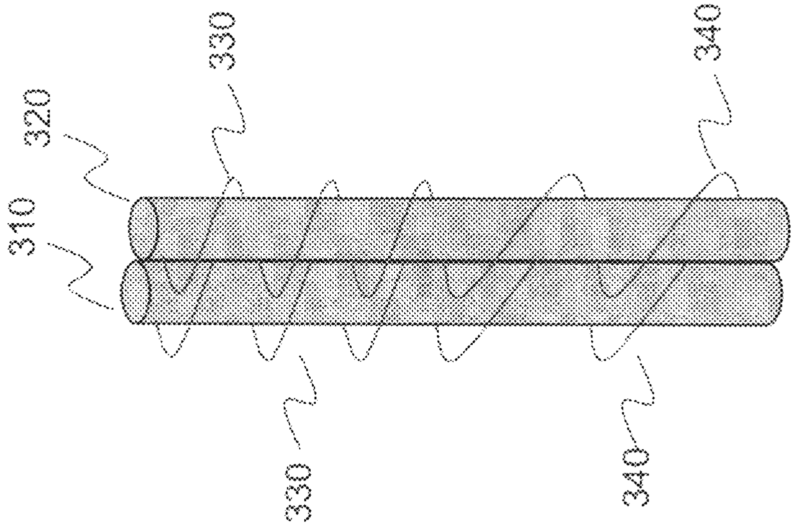
FIG. 3A provides a diagram of two nanotubes isolated with ssDNA, according to an embodiment of the invention.

FIG. 3A provides a diagram of two nanotubes 310 and 320 that illustrate the result of these steps. First ssDNA 330 wraps around each of nanotubes 310 and 320. Second ssDNA 340 also wraps around nanotubes 310 and 320 to create a biased helix pitch.

FIG. 3B provides a diagram of two nanotubes 310 and 320 that illustrates a pigtail arrangement. First ssDNA 330 wraps around each of nanotubes 310 and 320 and second ssDNA 350 forms a pigtail arrangement between nanotubes 310 and 320.

Nanoswitch

In another aspect of the invention, nanotubes are used to create a nanoswitch for use in controlling RF networks, such as, for example reconfigurable antennas and digital phase shifters. The nanoswitch can be activated by an electrostatic voltage or by illumination with a light source. S. Axelsson et al., *Theoretical and Experimental Investigations of Three Terminal Carbon Nanotube Relays*, New Journal of Physics, 7 (2005) 245, describes a configuration of a nanotube nanorelay switch in a cantilever configuration, which is herein incorporated by reference. Movement of nanotubes by light excitation is described in S. Y. Zhang et al., *Elastic Response of Carbon Nanotube Bundles to Visible Light*, Phys. Rev. Letters, V. 82, n.17, 26 Apr. 1999 and W. Euler, *Actuators Based upon Carbon Nanotube/Nafion Bi-Layer Composites*, Univ. of Rhode Island Presentation to Air Force Research Lab, Hanscom AFB, 2005, both of which are incorporated herein by reference.

High Permeability Material Using Nanotube Tori

In a further aspect of the invention many nanotube tori are used in such a way that they would inductively (magnetically) couple to inductors that are otherwise constructed in methods known to individuals skilled in the relevant arts, that is, using standard metallic wires. Fabrication of carbon nanotubes in closed toroidal rings has been demonstrated. A self-assembly procedures can be used. Furthermore, carbon nanotube toroidal ring configurations are stabilized by van der Waals forces. See R. Martel et. al., *Ring Formation in Single-Wall Carbon Nanotubes*, The Journal of Physical Chemistry, 103, No. 36, Sep. 9, 1999, P 7551-6, which is herein incorporated by reference.

Figure 4:
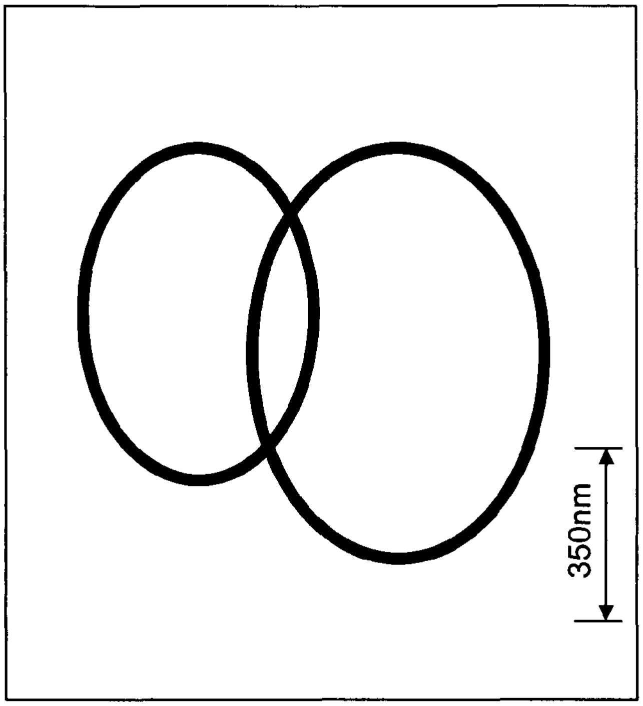
FIG. 4 illustrates a set of nanotube tori.
Figure 5:
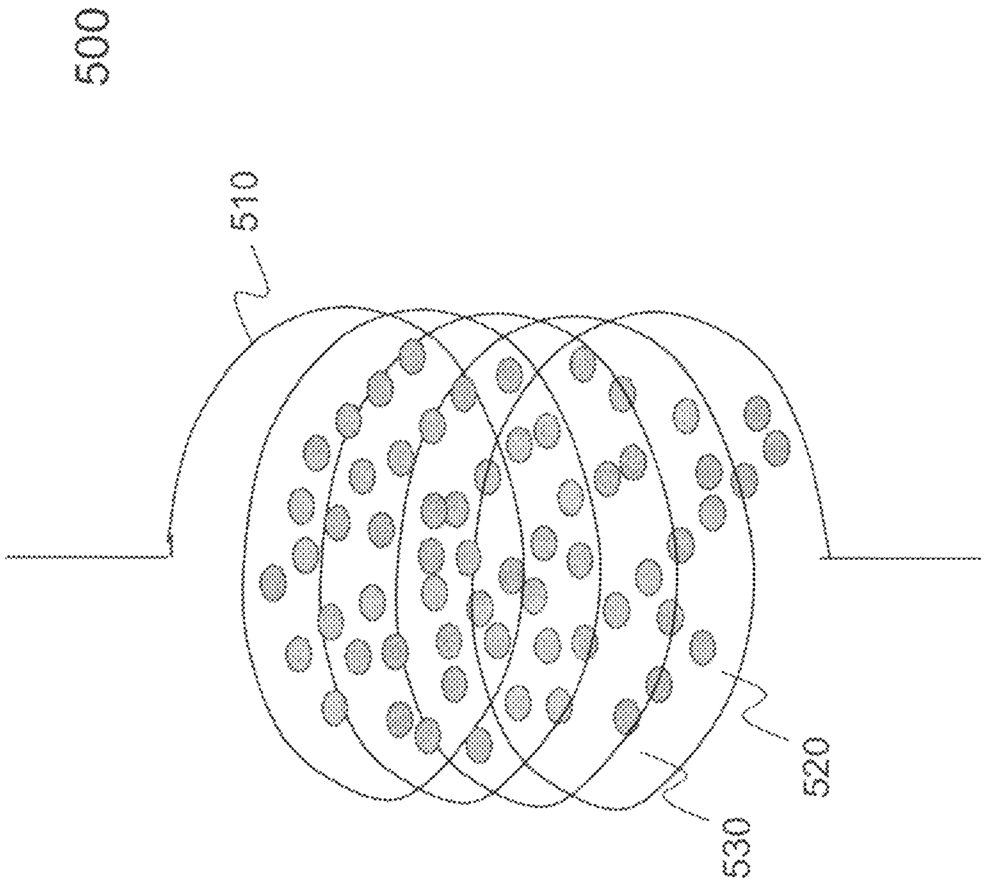
FIG. 5 illustrates low loss, high permeability ("LLHMu") material, according to an embodiment of the invention.

FIG. 4 provides an example 400 of a set of nanotube tori. FIG. 5 illustrates low loss, high permeability ("LLHMu") material 500, according to an embodiment of the invention. LLHMu material 500 includes conducting coil 510 and a plurality of nanotube tori 520. The nanotube tori 520 are embedded in inert material 530. A large number of nanotube toroids 520, on the order of $10^6$-$10^8$ are placed within inert material 530. Inert material 530 is a low loss dielectric material. The nanotube tori 520 are arranged coaxially within inert material 530. In this way, currents induced in the nanotube tori 520 will increase the effective conductance of conducting coil 510. Modeling has shown that the presence of an axial magnetic field is paramagnetic for a zig-zag nanotube. See L. Liu et al., *Colossal Paramagnetic Moments in Metallic Carbon Nanotori*, Physical Review Letters, 88 No. 21, 27 May 2003. The high conductance of the nanotubes for low applied energy should increase the inductance of the coil while minimizing the ohmic loss.

Figure 8:
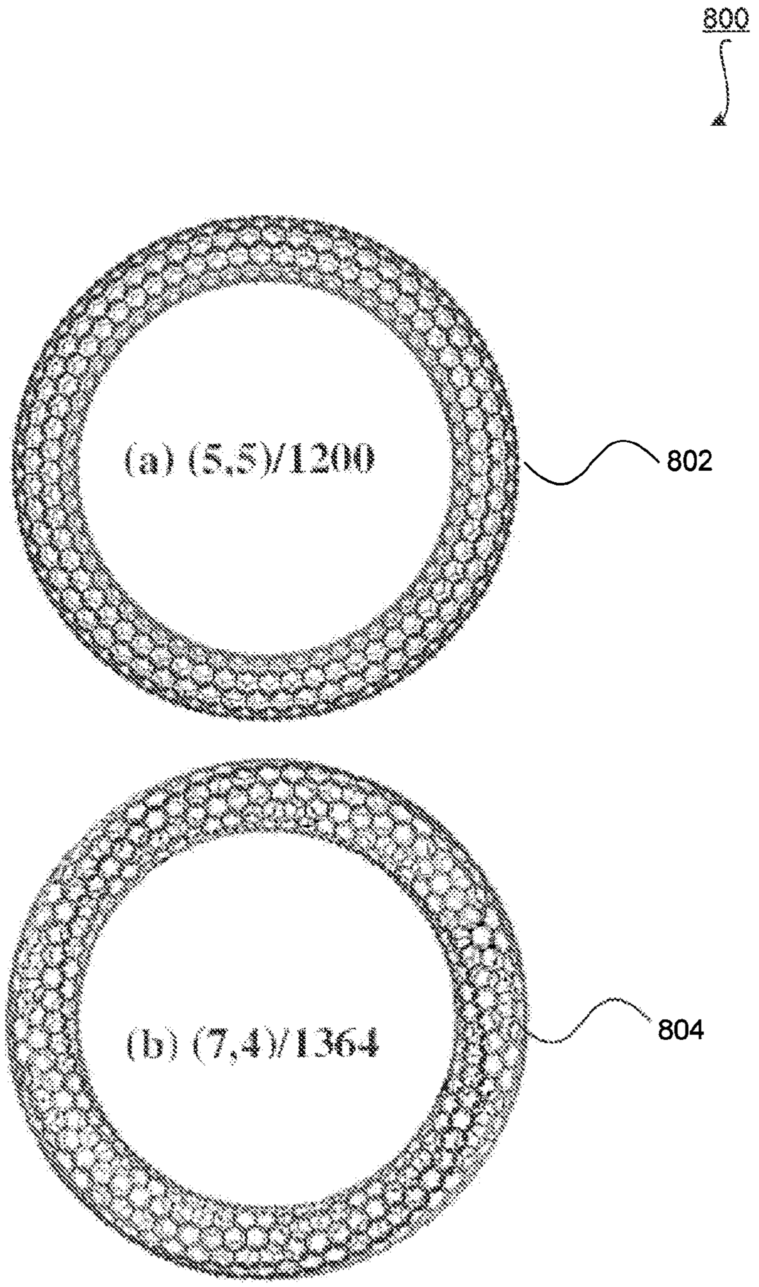
Prior Art FIG. 8
FIG. 8 illustrates atomic arrangements of two examples of nanotube tori.
Figure 9:
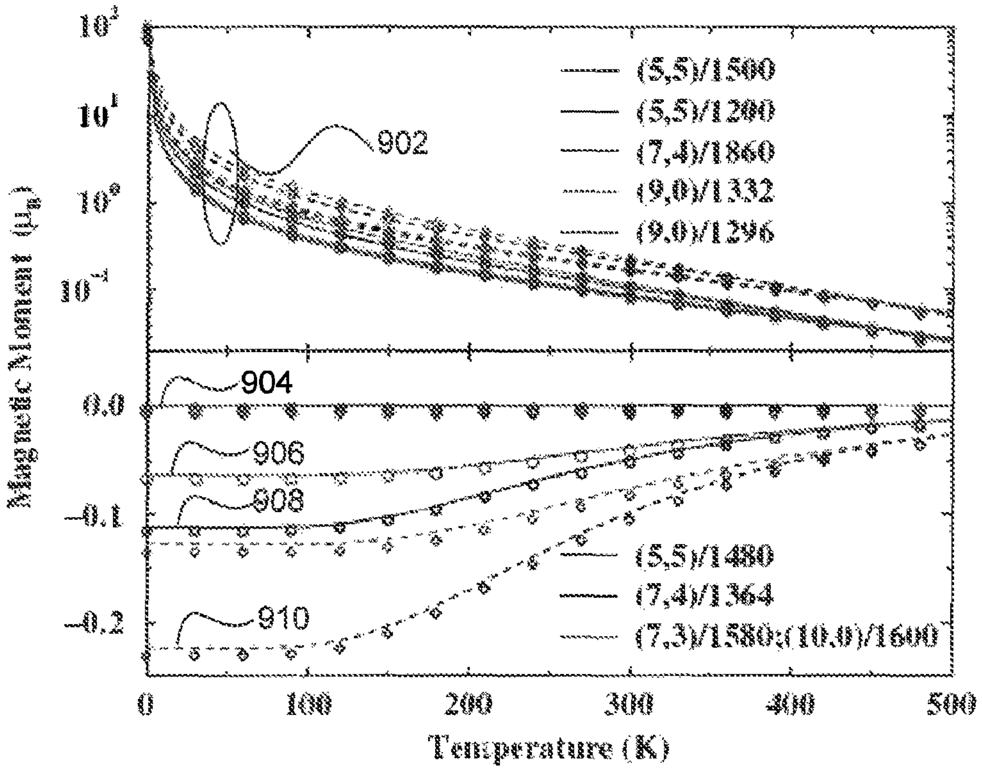
Prior Art FIG. 9
FIG. 9 shows calculated induced magnetic moments vs. temperature of various carbon nanotori.

The novel and useful magnetic properties of nanotube tori are illustrated in FIGS. 8 and 9. These figures are taken from L. Liu et al., *Colossal Paramagnetic Moments in Metallic Carbon Nanotori*, Phys. Rev. Letters, V. 88, n.21, 27 May. 2003 (referenced above). The electronic and magnetic properties of nanotube tori depend on their detailed atomic structures. FIG. 8*a*, for example, illustrates a nanotube torus that has metallic conducting properties and large paramagnetic moments (i.e. several orders of magnitude larger than the diamagnetic moment of graphite at 0.1 T). In contrast, FIG. 8*b* illustrates a nanotube torus that has semiconducting properties and relatively weak diamagnetic moment.

FIG. 9 summarizes the magnetic properties of various nanotube tori vs. temperature (also taken from the reference mentioned in the previous paragraph). Certain metallic nanotube tori 902 have giant paramagnetic moments (i.e. several orders of magnitude larger than the diamagnetic moment of graphite at 0.1 T) as a function of temperature, while other metallic nanotube tori (e.g., 906, 908, and 910) exhibit weak diamagnetic moments vs. temperature. An example of a semiconducting nanotube torus 904 is also shown. In this last example the semiconducting nanotube torus 904 exhibits a magnetic moment that is independent of temperature in the range from 0 to 500 K.

The nanotube tori coupled inductors can be used in, for example, RF and microwave applications. Because of this inductive coupling the nearby metallic wire inductors would have increased conductance, and higher Q. The advantage of this approach is that effectively a nanotube inductor is achieved without the problems of forming contacts between the nanotubes and a metallic conductor. The connection is due to inductive coupling. By embedding many nanotube tori in an inert material, this approach can result in the ability to create high permeability material with low loss, due to the ballistic conduction properties in nanotubes.

LLHMu materials have many potential applications. A LLHMu can be used to load an antenna, reducing its electrical size while maintaining a higher input resistance than is achievable with a high permittivity material. This can significantly help in the design of electrically small antennas. A LLHMu material can be used in a similar manner as a substrate for designing microstrip patches and conformal dipole antennas. A LLHMu material can potentially be blended with a lossy high permittivity material to make low profile electromagnetic absorbing materials. Other applications can include applications requiring low loss inductors, toroids, baluns, and AC transformers, RF transformers, microwave transformers, and the like. Within transformers this approach may overcome the present hysteresis loss in the magnetic materials, which is responsible for a significant percentage of the power loss in electrical distribution systems.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A transmission line, comprising:

(a) a bundle of approximately 10,000 single-walled carbon nanotubes;

(b) a conductive sheet, wherein the bundle of approximately 10,000 single-walled carbon nanotubes is supported in a plane above the conductive sheet.

2. The transmission line of claim 1, wherein the bundle of single walled carbon nanotubes are aligned.

3. The transmission line of claim 1, further comprising proteins, wherein the proteins isolate nanotubes within the bundle of single walled carbon nanotubes from each other.

4. An inductor, comprising (a) a bundle of approximately 10,000 single-walled carbon nanotubes;

(b) a conductive sheet, wherein the bundle of single-walled carbon nanotubes is supported in a plane above the conductive sheet, wherein the bundled of single-walled carbon nanotubes and the conductive sheet are coiled.

5. The inductor of claim 4, wherein the bundle of single-walled carbon nanotubes are aligned.

6. The inductor of claim 4, further comprising proteins, wherein the proteins isolate nanotubes within the bundle of single walled carbon nanotubes from each other.

7. A method for synthetic biologic manipulation to wrap, isolate and combine nanotubes, so as to generate a bundle of approximately 10,000 single-walled carbon nanotubes, comprising:

selectively wrapping nanotubes having a specified diameter and symmetry with a first ssDNA molecule;

selectively wrapping the nanotubes with a second ssDNA molecule to create a biased helix pitch around the nanotubes;

linking nanotubes that are wrapped in similar ssDNA by matching their biased counterparts, thereby aligning and isolating the nanotubes so as to generate a bundle of approximately 10,000 single-walled carbon nanotubes.

8. A low loss, high permeability material, comprising:

a conducting coil;

a plurality of nanotube tori; and an inert material located within the conducting coil, having the plurality of nanotube tori embedded therein.

9. The low loss, high permeability material of claim 8, wherein the nanotube tori are axially aligned.

* * * * *

UNITED STATES PATENT AND TRADEMARK OFFICE

CERTIFICATE OF CORRECTION

PATENT NO. : 8,013,247 B2
APPLICATION NO. : 11/790488
DATED : September 6, 2011
INVENTOR(S) : Werth et al.

It is certified that error appears in the above-identified patent and that said Letters Patent is hereby corrected as shown below:

Column 6, line 22, please replace “single walled carbon nanotubes” with --single-walled carbon nanotubes--.
Column 6, line 25, please replace “single walled carbon nanotubes” with --single-walled carbon nanotubes--.
Column 6, line 26, please replace “inductor, comprising” with --inductor, comprising:--.
Column 6, line 37, please replace “single walled carbon nanotubes” with --single-walled carbon nanotubes--.

Signed and Sealed this
Eighth Day of November, 2011

David J. Kappos
*Director of the United States Patent and Trademark Office*